United States Patent [19]

Pip

[11] Patent Number: 4,740,530

[45] Date of Patent: Apr. 26, 1988

[54] METHOD FOR FOAMING SYNTHETIC RESIN BODIES WITH MICROWAVE OR HIGH FREQUENCY ENERGY

[75] Inventor: Wolfgang Pip, Darmstadt-Eberstadt, Fed. Rep. of Germany

[73] Assignee: Röhm GmbH, Darmstadt, Fed. Rep. of Germany

[21] Appl. No.: 91,970

[22] Filed: Sep. 2, 1987

[30] Foreign Application Priority Data

Sep. 11, 1986 [DE] Fed. Rep. of Germany ....... 3630930

[51] Int. Cl.$^4$ ............................................... C08J 9/00
[52] U.S. Cl. ...................................... 521/149; 521/94; 521/95; 521/146; 521/147; 521/915
[58] Field of Search ................... 521/149, 915, 94, 95, 521/146, 147

[56] References Cited

U.S. PATENT DOCUMENTS 3,627,711 12/1971 Schroeder et al. .................... 521/94

FOREIGN PATENT DOCUMENTS 2134845 8/1984 United Kingdom .

*Primary Examiner*—Morton Foelak
*Attorney, Agent, or Firm*—Curtis, Morris & Safford

[57] ABSTRACT

A slab of rigid heat-foamable organic synthetic resin is heated until at least a portion of its surface is at or above the softening temperature of the resin, whereupon a microwave or high frequency field is allowed to act on the slab until foaming occurs.

2 Claims, No Drawings

METHOD FOR FOAMING SYNTHETIC RESIN BODIES WITH MICROWAVE OR HIGH FREQUENCY ENERGY

The present invention relates to a method for making a rigid foam article by prewarming a rigid heat-foamable synthetic resin until at least a portion of the resin surface is softened and then initiating the foaming process by further heating with microwave or high-frequency radiation. More in particular, the prewarmed synthetic resin is a copolymer comprising at least 80 percent by weight of units of acrylic acid or methacrylic acid and of acrylonitrile or methacrylonitrile, together with a blowing agent. On heating, acrylimide or methacrylimide groups are formed from the acid and nitrile groups.

THE PRIOR ART

In Plastverarbeiter 34, 1488-1492, (1983), G. Menges et al., describe the production of a crosslinked polyethylene foam. Polyethylene molding compound is melted and homogenized together with blowing and crosslinking agents in an extruder, extruded into a strand, and heated to foaming with microwave radiation. In this method, for the sake of economy, the extrudate is not cooled after extrusion but exposed immediately to the microwave radiation.

The production of rigid foamed synthetic resins, for example polymethacrylimide foamed resins, by heating a rigid slab of a synthetic resin foamable on heating is known from German patent No. 1,817,156. The slab is heated in an air oven to foaming temperature. Because of the low thermal conductivity of organic synthetic resins, this is a time-consuming process. From published German patent application DE-OS No. 33 04 882, it is further known to heat a polymethacrylimide foam with microwaves to produce further expansion of the foamed plastic.

THE INVENTION

Attempts at initiating the foaming of a rigid slab of synthetic resin foamable on being heated by exposing it to the action of microwave radiation rather than to an air oven have been unsuccessful. As was to be expected, the slab is heated simultaneously throughout its thickness (provided that it possesses the requisite microwave absorption characteristics). However, the product is always an irregular cracked body rather than the desired foamed slab. It has been found that this is because of a premature onset of foaming in the interior of the slab, so that the outer regions burst and crack. This problem is not encountered with flexible and tough synthetic resins.

It has been found according to the present invention that uniform foam slabs are obtained in a microwave or high-frequency field if a rigid slab of foamable synthetic resin is preheated until at least a portion of its surface is at or above the softening temperature of the resin and the microwave or high-frequency field initiating the foaming process is then allowed to act on the slab until foaming occurs. It is important that a microwave or high-frequency field of an intensity that will induce foaming not be allowed to act on the foamable synthetic resin slab until at least a portion of its surface has been thermally softened. How it is heated is not important so long as this condition is satisfied. If preheating is effected by means of a microwave or high-frequency field, its intensity must be such that foaming will not set in. Only once the surface is softened can the strength of the field be increased to initiate foaming. The foam produced will deform the softened surface to form a "pillow". As the softening of the surface progresses, further regions of the synthetic resin slab are foamed with an increase in volume until the entire slab has been transformed into a foamed resin body. Thermal softening of the surface provides assurance that the synthetic resin body will be able to follow the foaming process without the foaming pressure giving rise to local stresses that would lead to fracture of the synthetic resin. Once such fractures occur, a uniform foamed slab usually cannot be obtained.

PRACTICE OF THE INVENTION

It is not necessary that the entire surface of the synthetic resin slab be softened at the time that foaming sets in, provided that a continuous zone of thermally softened material extends from the surface to the region where foaming sets in. In practice, this requirement will always be met because the synthetic resin slab is closest to the foaming temperature in the vicinity of the softened surface zone, so that under the action of the microwave or high frequency field that temperature level is reached there first. Similarly, extension of the softened surface zone will keep pace with advancing foam formation until eventually the entire surface has been softened. From that moment on, the risk of stress fracture is eliminated. Foaming will continue unimpeded until the entire slab has been foamed.

By the "softening temperature" is meant that temperature at which the synthetic resin elastically expands under the foaming pressure without fracturing. The temperature at which this condition occurs may be exceeded, but preferably not to the extent that the temperature region of plastic deformability is reached.

Any heat source with which the softening temperature can be reached at the surface is suitable for the preheating of the foamable synthetic-resin slab. For example, an air oven in which an appropriately heated atmosphere, usually air, will act on the surface of the slab may be employed, or the slab surface may be exposed to heat radiation. Heating by heat transfer from a liquid medium or a hot solid surface is also possible but is usually less convenient.

As pointed out above, microwave fields or high-frequency fields can be used for preheating, alone or together with the other heat sources mentioned, provided that care is taken that foaming is not prematurely induced in the interior. To this end, a field of appropriately low intensity may be used or the field may be allowed to act on the slab only momentarily or intermittently.

When the softening temperature and the temperature at which foaming sets in are close together, it is difficult to adjust the intensity of the microwave field or high frequency field so that the foaming temperature is not reached in the interior until the surface has softened. It is therefore preferable to have one of the other heat sources mentioned additionally act directly on the surface.

As soon as a portion of the surface has reached the softening temperature, the microwave or high-frequency field adapted to induce foaming can be cut in. This is preferably done only when the surface of the synthetic resin slab has been heated completely or almost completely to or above the softening temperature.

It is not detrimental if foaming has already set in at the surface. Further heating to foaming temperature is faster than with any other heat source acting only externally.

Microwave ovens which are suitable for use in the method of the invention are known in the art, where they are employed for drying, for example. They operate with wavelengths ranging from 1 to 50 cm. The most commonly used wavelength is 12.3 cm, which corresponds to 2450 MHz. The radiation or field is produced by a so-called magnetron and is distributed in the microwave oven as uniformly as possible. The more uniform the field, the lower the danger that isolated foaming zones will form that are not associated with a softened surface zone. With regard to the design and operation of microwave generators, reference is made to the pertinent literature. See, for example, H. Puschner, *Warme durch Mikrowellen* ("*Heating with Microwaves*"), Philips Technische Bibliothek, 1964, and G. Nimtz, *Mikrowellen* ("*Microwaves*"), Carl Hanser Verlag, 1980. The power output of the microwave generator will, of course, have to be based on the size of the synthetic resin slab to be foamed and on the foaming temperature required.

High frequency generators suitable for use in the method of the invention operate at wavelengths ranging from 1 to 50 meters. A commonly used wavelength is 11 meters, which corresponds to 27.12 MHz. Such generators are employed to heat-seal plastics and to foam wetted polystyrene beads. (See *Kunststoff-Physik im Gespraech* ("*Discourse on the Physics of Synthetic Resins*"), a publication of BASF AG, 1969, p. 179.) Here, too, a field distribution that is as uniform as possible will be advantageous.

In order that a material may be heated in a microwave or high-frequency field, it must be capable of absorbing the respective radiation. That will be the case of the material contains a sufficient number of polar structures. Such structures may be a constituent of the polymer molecules which make up the synthetic resin or they may be contained in low molecular weight substances, such as water or formamide, admixed with it. Synthetic resins having polar structures include those which contain carbonyl, carboxyl, hydroxyl, halogen, amino, or carboxylamido groups.

In particular, synthetic resins containing a copolymer comprising at least 80 percent by weight of units of acrylic acid or methacrylic acid and of acrylonitrile or methacrylonitrile are suitable for use in the method of the inventions. The polymer should comprise at least 20 percent by weight of acrylic acid or methacrylic acid. Preferably the ratio by weight of acrylic acid and/or methacrylic acid to acrylonitrile and/or methacrylonitrile is from 3 : 2 to 2 : 3. In addition to these monomers, the copolymer may contain up to 20 percent by weight of other ethylenically unsaturated monomers copolymerizable therewith, for example acrylamide and methacrylamide, styrene, lower alkyl ($C_1$-$C_4$) esters of acrylic acid and methacrylic acid, as well as up to 5 percent by weight of crosslinking monomers having 2 or more polymerizable double bonds, such as esters of acrylic acid and methacrylic acid with polyols (e.g. glycol dimethacrylate), divinylbenylene, triallyl cyanurate, and methylene-bis-acrylamide. Also, metal salts of acrylic acid and methacrylic acid may be present in amounts up to 5 percent by weight, particularly salts of polyvalent metal ions such as $Mg^{2+}$, $Zr^{4+}$, $Cr^{3+}$, $Co^{2+}$, $Zn^{2+}$, $Cd^{2+}$, $Bi^{3+}$, $TiO^{2+}$, and $Pb^{2+}$. These synthetic resins soften at from 140° C. to 150° C. and start to foam from 160° C. to 180° C. Concurrently, a reaction of polymerized units of acrylonitrile or methacrylonitrile and units of acrylic or methacrylic acid takes place to form units of acrylimide or methacrylimide. Foamed plastics based on polymethacrylimide have acquired considerable commercial importance.

For foaming, such resins also comprise from 2 to 15 percent, preferably 2 to 10 percent, by weight of a blowing agent which on being heated yields a gas or vapor. Formamide, monomethyl formamide, urea, water, and lower aliphatic alcohols are illustrative of such blowing agents, which are well known in the art.

Slabs of such a synthetic resin having a thickness of from 1 to 4 cm, for example, are best heated in a circulating air oven at 170° C. to 200° C. until the surface softens and are then exposed to a microwave field. Preheating usually takes from about 5 to 30 minutes, while the microwave treatment requires somewhat less time. By contrast, when foaming is effected by the use of hot air alone, a foaming time of about 2 hours is required.

A better understanding of the invention and of its many advantages will be had by referring to the following specific examples, given by way of illustration.

EXAMPLES

EXAMPLE 1

Foaming in a Microwave Field

To produce a polymethacrylimide foamed plastic slab, a slab measuring 70×70×23 mm of a rigid foamable synthetic resin having a softening temperature of 160° C. and containing a copolymer of methacrylic acid and methacrylonitrile in a molar ratio of 3:2 together with 8 percent, by weight of the polymer, of a blowing agent mixture of formamide and tert.-butanol was preheated in a hot air oven to an approximately uniform surface temperature of 160° C. within 30 minutes and then treated for 6 minutes with a microwave field whose power was controlled through an operating cycle of 10 seconds of radiation followed by a 50-second pause. A foam slab naming a density of 38 kg/m³ was so obtained.

The microwave oven employed (Sharp Model R 8000 E) had a power consumption of 1.4 kw in the hot air section and of 1.3 kw in the microwave section, with a power output of 650 watts with a 2-liter water load, and had been retrofitted to permit simultaneous microwave and hot air operation. This made it possible to carry out the entire foaming operation in the same unit using only hot air during the preheating time and then cutting in microwave heating for foaming.

EXAMPLE 2

Foaming in a High Frequency Field

To produce a polymethacrylimide foam slab, a slab measuring 120×120×23 mm of a rigid foamable synthetic resin having a softening temperature of 180° C. and containing a weakly crosslinked copolymer of methacrylonitrile and methacrylic acid in the aforementioned molar proportions and 10 percent, by weight of the polymer, of a blowing agent mixture of formamide and tert-butanol was preheated for 30 minutes in a hot air oven to an approximately uniform surface temperature of 180° C.

For foaming, the preheated slab was placed between the electrodes if a high frequency furnace (Model HGV 4001 of the firm Herfurth GmbH) having a useful output of 4 kw at a frequency of 27.12 MHz. The electrodes measured 400×400 mm. To focus of the electric field, two shaped aluminum electrodes, measuring 80×80×10 mm and having rounded corners and which had been preheated to the same temperature, were placed on the surfaces of the preheated slab. Foaming was initiated with an 0.4 ampere current and terminated after 5 minutes. A foam slab with a density of 48 kg/m$^3$ was so obtained.

EXAMPLE 3

A monomer mixture comprising:
1124 g (55.6 wt. %) of methacrylic acid,
876 g (43.4 wt. %) of methacrylonitrile,
10 g ( 0.5 wt. %) of magnesium dimethacrylate,
2 g ( 0.1 wt. %) of allyl methacrylate, and
3 g ( 0.4 wt. %) of glycol dimethacrylate,
was combined with 125 g of isopropanol as a blowing agent and 3 g of butyl perpivalate as an initiator and polymerized to form a plate 6 mm thick. A piece 70×70 mm in size was prewarmed for 30 minutes in a warming oven at 220° C., during which no foaming occurred.

Subsequently the prewarmed piece was foamed in 5–7 minutes in a high frequency field as in Example 2, during which 50 percent of maximum output was intermittently applied.

A uniform foam was obtained.

What is claimed is:

1. A method for making a rigid foam article, which method comprises heating a heat-foamable rigid slab of synthetic resin containing a blowing agent until at least a portion of the surface of said slab is at least at the softening temperature of said resin but foaming is not initiated, and thereafter subjecting the warmed slab to microwave or high frequency radiation, whereby said slab is further heated to expand said blowing agent and to foam said foamable slab, wherein said synthetic resin comprises an acid monomer selected from the group consisting of acrylic acid and methacrylic acid and a nitrile monomer selected from the group consisting of acrylonitrile and methacrylonitrile, said acid monomer being at least 20 percent by weight of said polymer and said acid and nitrile monomers together being at least 80 percent by weight of said polymer.

2. A method as in claim 1 wherein the ratio by weight of said acid monomer to said nitrile monomer is from 3 : 2 to 2 : 3.

* * * * *